C. H. GUARD.
Improvement in the Manufacture of Screw Threaded Nuts.
No. 123,823.                                  Patented Feb. 20, 1872.
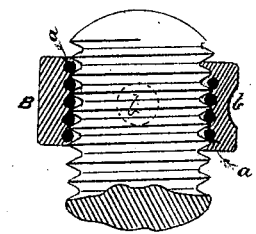
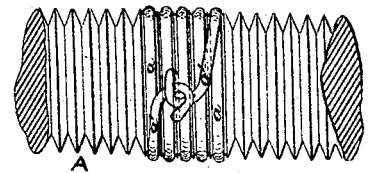

UNITED STATES PATENT OFFICE.

CHAUNCEY HOLMES GUARD, OF TORONTO, CANADA.

IMPROVEMENT IN MANUFACTURE OF SCREW-THREADED NUTS.

Specification forming part of Letters Patent No. 123,823, dated February 20, 1872.

SPECIFICATION.

I, CHAUNCEY HOLMES GUARD, of the city of Toronto, in the county of York, Province of Ontario and Dominion of Canada, gentleman, have invented certain Improvements in the Manner of Making Bolt-Nuts, of which the following is a specification:

Nature and Objects of the Invention.

My invention relates to an improvement in the manner of making bolt-nuts; and consists in casting them upon a mandrel, forming the thread of wire, as hereinafter described. Also, making an indentation in the said nut for the purpose of locking it, as hereafter described.

Description of the Accompanying Drawing.

Figure 1, sectional elevation. Fig. 2 shows manner of preparing wire.

General Description.

Upon a mandrel, A, which has had a thread cut upon it the proper pitch for the nut about to be made, I wind a wire, $a$, following the thread, and when a sufficient number of threads have been taken in to form one through the nut, I tie the wire, as shown in Fig. 2. A wire nut is thus formed upon the mandrel A. Into a mold around this wire nut I cast, of iron, brass, or of any suitable material, the nut proper, B, the wire nut forming the thread of it.

It will be understood that, casting the nut in this manner the wire becomes solid, as it were, with the nut B, and the metal forming around the tie $a'$, removes the possibility of the two separating; but as the wire does not fit the thread on the mandrel so closely, as may be seen in Fig. 1, the whole nut will screw off it when cold, leaving a perfect thread made of the wire $a$ in the nut B.

A nut made in this manner is much cheaper than the ordinary kind, as the strength is in the thread, consequently the body of the nut need not be so heavy. The fiber of the iron follows the thread instead of crossing it; therefore it becomes almost impossible to strip the thread of my nut.

What I claim as my invention is—

The method herein described of manufacturing screw-threaded nuts.

City of Toronto, 25th day of September, 1871.

CHAUNCEY HOLMES GUARD.

Witnesses:
DONALD C. RIDOUT,
CLAUD Y. CAYLEY.